(12) United States Patent
Yan et al.

(10) Patent No.: US 7,786,420 B2
(45) Date of Patent: Aug. 31, 2010

(54) LIGHT SOURCE DEVICE AND METHOD FOR MODULATING BRIGHTNESS OF LIGHT EMITTED BY SAME AND LIQUID CRYSTAL DISPLAY USING SAME

(75) Inventors: Shuo-Ting Yan, Miao-Li (TW); Tsau-Hua Hsieh, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 80 days.

(21) Appl. No.: 12/001,552

(22) Filed: Dec. 11, 2007

(65) Prior Publication Data

US 2008/0135737 A1 Jun. 12, 2008

(30) Foreign Application Priority Data

Dec. 11, 2006 (TW) ............... 95146231 A

(51) Int. Cl.
*G09G 3/36* (2006.01)
*G01J 1/44* (2006.01)
*H05B 37/02* (2006.01)

(52) U.S. Cl. ............... 250/205; 250/214 AL; 315/150; 315/158

(58) Field of Classification Search ......... 250/205, 250/214 AL, 214 B, 214 C; 252/501.1, 520.22, 252/521.4, 521.5, 521.6; 315/150, 156, 158; 338/15

See application file for complete search history.

(56) References Cited

U.S. PATENT DOCUMENTS

| | | | | |
|---|---|---|---|---|
| 3,601,614 A | * | 8/1971 | Platzer | 250/214 AL |
| 3,819,938 A | * | 6/1974 | Kornrumpf et al. | 250/222.1 |
| 3,900,763 A | * | 8/1975 | Turner | 315/156 |
| 3,960,577 A | * | 6/1976 | Prochazka | 252/504 |
| 4,250,488 A | * | 2/1981 | Haupt | 382/274 |
| 4,287,517 A | * | 9/1981 | Nagel | 340/636.15 |
| 4,329,625 A | * | 5/1982 | Nishizawa et al. | 315/158 |
| 4,438,348 A | * | 3/1984 | Casper et al. | 327/513 |
| 4,539,283 A | * | 9/1985 | Shirai et al. | 430/61 |
| 4,585,339 A | * | 4/1986 | Senoo | 355/69 |
| 4,588,926 A | * | 5/1986 | Pezzolo | 315/155 |
| 4,624,862 A | | 11/1986 | Yang et al. | |
| 4,647,958 A | * | 3/1987 | Gardner | 257/51 |
| 4,659,183 A | * | 4/1987 | Suzawa | 349/67 |
| 4,914,042 A | * | 4/1990 | Mahan | 438/24 |
| 5,140,397 A | * | 8/1992 | Haga et al. | 257/53 |
| 5,210,766 A | | 5/1993 | Winer et al. | |

(Continued)

FOREIGN PATENT DOCUMENTS

CN 85108824 A 8/1986

(Continued)

*Primary Examiner*—John R Lee
(74) *Attorney, Agent, or Firm*—Wei Te Chung

(57) ABSTRACT

An exemplary light source device (10) includes a power supply (12), a light source (14), and a photodetector (16). The photodetector includes a light sensor (17) and a resistor (18) connected in parallel. The power supply, the light source, and the photodetector are connected in series. When the intensity of ambient light increases, a resistance of the light sensor decreases so as to increase a light intensity of the light source. When the intensity of ambient light decreases, the resistance of the light sensor increases so as to decrease the light intensity of the light source.

17 Claims, 2 Drawing Sheets

U.S. PATENT DOCUMENTS

| | | | |
|---|---|---|---|
| 6,294,874 B1* | 9/2001 | Rudolph et al. | 315/158 |
| 6,479,837 B1* | 11/2002 | Ogawa et al. | 257/59 |
| 6,489,631 B2* | 12/2002 | Young et al. | 257/59 |
| 6,509,066 B1* | 1/2003 | Jost | 427/529 |
| 7,256,470 B2* | 8/2007 | Bui et al. | 257/461 |
| 7,271,378 B2* | 9/2007 | Cok | 250/214 AL |
| 7,314,513 B1* | 1/2008 | Zurcher et al. | 106/287.14 |
| 7,462,811 B2* | 12/2008 | Cok et al. | 250/214 AL |
| 7,626,509 B2* | 12/2009 | Dean | 340/691.8 |
| 2001/0052597 A1* | 12/2001 | Young et al. | 257/59 |
| 2004/0075045 A1* | 4/2004 | Hermsen | 250/205 |
| 2006/0202947 A1 | 9/2006 | Lee | |
| 2007/0138951 A1* | 6/2007 | Park et al. | 313/504 |
| 2007/0188441 A1* | 8/2007 | Tanaka et al. | 345/102 |
| 2007/0252799 A1* | 11/2007 | Yan | 345/87 |
| 2007/0257329 A1* | 11/2007 | Bui et al. | 257/443 |
| 2008/0135737 A1* | 6/2008 | Yan et al. | 250/214 AL |
| 2008/0142920 A1* | 6/2008 | Tai et al. | 257/463 |
| 2008/0157682 A1* | 7/2008 | Kwon | 315/154 |
| 2008/0158211 A1* | 7/2008 | Kwon | 345/207 |
| 2008/0164473 A1* | 7/2008 | Tai et al. | 257/59 |

FOREIGN PATENT DOCUMENTS

| | | |
|---|---|---|
| CN | 1124729 C | 10/2003 |
| CN | 1724983 A | 1/2006 |
| CN | 1831590 A | 9/2006 |

* cited by examiner

LIGHT SOURCE DEVICE AND METHOD FOR MODULATING BRIGHTNESS OF LIGHT EMITTED BY SAME AND LIQUID CRYSTAL DISPLAY USING SAME

FIELD OF THE INVENTION

The present invention relates to a light source device that is capable of adjusting intensity of output light beams according to prevailing environmental conditions, a method for modulating a brightness of light emitted by the light source device, and a liquid crystal display using the light source device.

GENERAL BACKGROUND

A typical LCD has the advantages of portability, low power consumption, and low radiation. Therefore the LCD has been widely used in various handheld electronic products, such as mobile phones, notebooks, personal digital assistants (PDAs), video cameras, and the like.

The liquid crystal of an LCD does not itself emit light. Therefore it is common for a light source device to be installed with an LCD to enable the LCD to display images. Typically, the light source device needs a battery for supply of power.

The LCD of a handheld electronic product is typically used in different surroundings and environments. For example, the LCD is sometimes used in high ambient light conditions (e.g., in bright sunlight), and sometimes in relatively low ambient light conditions (e.g., in darkness).

In a typical LCD, the intensity of the light emitted from the light source device is almost constant, therefore the brightness of the LCD is essentially constant. When the LCD is used in high ambient light conditions, the intensity of the ambient light is close to or even higher than that of the light emitted from the LCD. That is, the contrast between the light of the LCD and the light of the environment is low. Therefore a user may not see images on the LCD clearly. When the LCD is used in low ambient light conditions, the intensity of ambient light is much lower than that of the light emitted from the LCD. That is, the contrast between the light of the LCD and the light of the environment is too high. Therefore the images displayed on the LCD may be too bright and displeasing.

Furthermore, the battery installed in the light source device is often quite small and therefore generally only has enough power to keep the LCD running for a few hours. When the LCD is used in low ambient light conditions, the intensity of the light of the LCD is liable to be more than what a user is comfortable with. That is, the power consumption of the LCD is unnecessarily high, and the battery life is needlessly shortened.

What is needed, therefore, is an LCD that can overcome the above-described deficiencies.

SUMMARY

A light source device includes a power supply, a light source, and a photodetector. The photodetector includes a light sensor and a resistor connected in parallel. The power supply, the light source, and the photodetector are connected in series. When the intensity of ambient light increases, a resistance of the light sensor decreases so as to increase a light intensity of the light source. When the intensity of ambient light decreases, the resistance of the light sensor increases so as to decrease the light intensity of the light source.

A method for modulating a brightness of light emitted by a light source device includes the following steps: providing a power supply and a light source, the power supply providing a constant voltage to the light source; providing a photodetector connected to the light source in series, the photodetector having a doped polycrystalline silicon unit and a fixed resistance connected in parallel, the doped polycrystalline silicon unit being sensitive to light and automatically changing its resistance in response to changes in ambient light; exposing the photodetector to ambient light; and the doped polycrystalline silicon unit automatically changing its resistance in response to a change in the ambient light, the photodetector thereby automatically modulating its own resistance, and thereby modulating a current passing through the light source such that a brightness of light emitted by the light source is modulated according to the ambient light.

A liquid crystal display includes a liquid crystal panel, and a light source device positioned for illuminating the liquid crystal panel. The light source device includes a power supply, a light source, and a photodetector. The photodetector includes a light sensor and a resistor connected in parallel. The power supply, the light source, and the photodetector are connected in series. When the intensity of ambient light increases, a resistance of the light sensor decreases so as to increase a light intensity of the light source. When the intensity of ambient light decreases, the resistance of the light sensor increases so as to decrease the light intensity of the light source.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments in detail.

Figure 1:
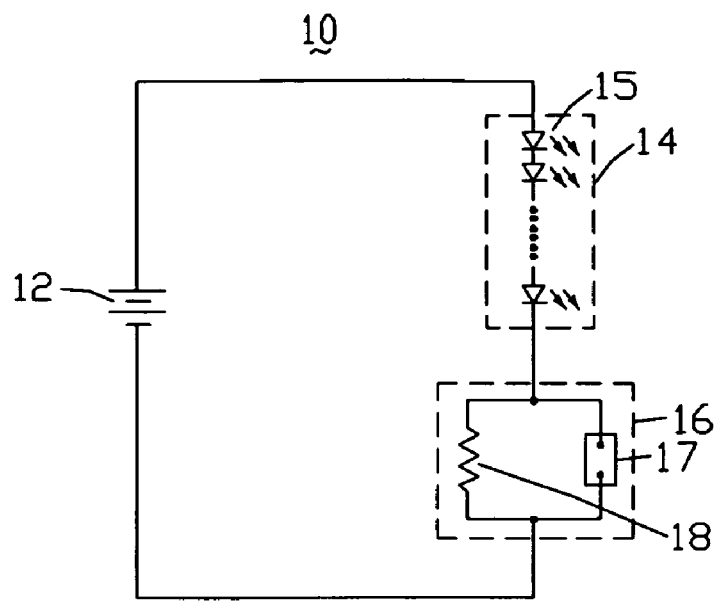
FIG. 1 is a schematic, abbreviated diagram of certain components of a light source device according to a first embodiment of the present invention, the light source device including a doped polycrystalline silicon unit and a plurality of light emitting diodes.

FIG. 1 is a schematic, abbreviated diagram of certain components of a light source device 10 according to a first embodiment of the present invention. The light source device 10 is typically employed in an LCD (not shown). The LCD typically includes a liquid crystal panel (not shown) for displaying images, and the light source device 10 for illuminating the liquid crystal panel. The LCD is typically installed in a handheld electronic product such as a mobile phone, personal digital assistant, video camera, and the like. The liquid crystal panel may be a transflective liquid crystal panel or a transmissive liquid crystal panel.

The light source device 10 typically includes a power supply 12, a light source 14, and a photodetector 16 for detecting radiation in the infrared, visible, and ultraviolet regions of the spectrum. The power supply 12 may be a battery. The light source 14 may be a plurality of light emitting elements connected in series. In the illustrated embodiment, the light emitting elements are LEDs 15.

The power supply 12 provides an invariable direct current voltage to the light source device 10. For example, the power supply 12 provides a constant voltage of 5V to the light source device 10. The intensity of the light emitted from the LEDs 15 varies along with the amount of current flowing therethrough. That is, the intensity of the light emitted from the LEDs 15 increases when the current flowing therethrough increases, and decreases when the current flowing therethrough decreases.

The photodetector 16 includes a doped polycrystalline silicon unit 17, and a resistor 18 connected in parallel with the doped polycrystalline silicon unit 17. The doped polycrystalline silicon unit 17 is configured to receive ambient light around the LCD during use. Such light can for example be sunlight, or light that is produced by an incandescent light source, a fluorescent light source, and the like. The doped polycrystalline silicon unit 17 may be located inside or outside the LCD, as long as it receives the ambient light. The resistor 18 is used as a shunt resistor.

Figure 2:
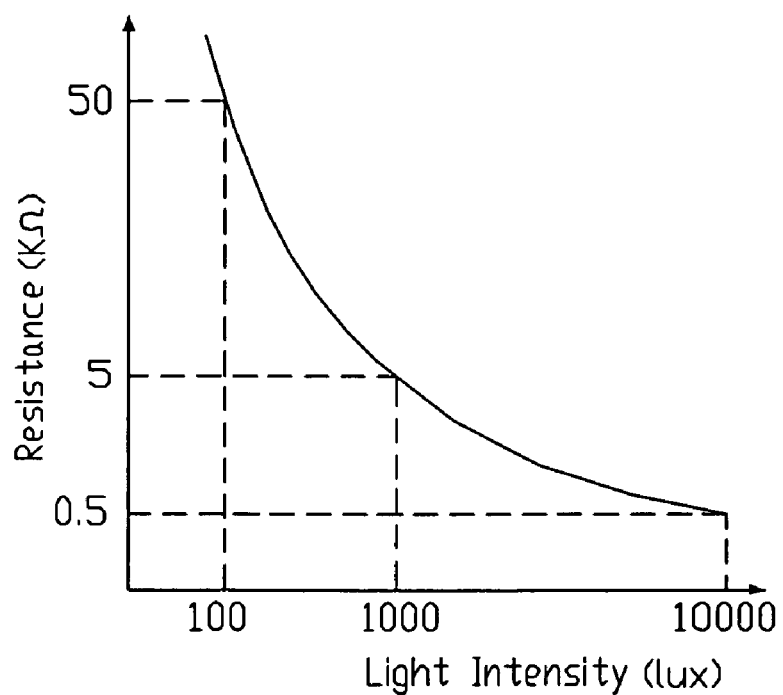
FIG. 2 is a graph showing a relationship whereby electrical resistance of the doped polycrystalline silicon unit of FIG. 1 varies according to ambient light intensity of an LCD that employs the light source device.

FIG. 2 is a graph showing a relationship whereby the electrical resistance of the doped polycrystalline silicon unit 17 varies according to the intensity of the ambient light. The light intensity is marked on the horizontal axis in lux; and the resistance is marked on the vertical axis in kilohms (KΩ) as a function of the light intensity. It can be seen that the greater the light intensity, the lower the resistance. For example, when the light intensity is 100 lux (e.g., the light intensity of an incandescent light source), the resistance of the doped polycrystalline silicon unit 17 is about 50 KΩ. When the light intensity is 1000 lux (e.g., the light intensity indoors during the day), the resistance of the doped polycrystalline silicon unit 17 is about 5 KΩ. When the light intensity is 10000 lux (e.g., the light intensity in direct sunlight in summer), the resistance of the doped polycrystalline silicon unit 17 is about 0.5 KΩ.

A typical LCD is used in conditions where the ambient light intensity is in the range from about 1000 lux to about 3000 lux, such as in an office in the daytime. When the LCD is taken out from the office and used outside in the sun, the light intensity of ambient light is typically in the range from about 1000 lux to about 10000 lux. The energy received by electrons of atoms of the doped polycrystalline silicon unit 17 increases with the increased ambient light intensity. Therefore the electrons may receive enough energy to become free electrons and thereby generate electron holes corresponding to the electrons. As a result, the doped polycrystalline silicon unit 17 has the electron holes and more free electrons to conduct electricity. Typically, the resistance of the doped polycrystalline silicon unit 17 decreases from about 5 KΩ to about 0.5 KΩ. The resistance of the photodetector 16 is defined by the resistance of the doped polycrystalline silicon unit 17 and the resistance of the resistor 18. Thus, the resistance of the photodetector 16 decreases with the increase in the ambient light intensity.

Accordingly, a voltage applied at the photodetector 16 decreases with the increase in the ambient light intensity. Because the voltage provided by the power supply 12 is constant, the voltage applied at the light source 14 correspondingly increases. That is, the voltage applied at each of the LEDs 15 increases and the current flowing through the LEDs 15 increases. Therefore the intensity of light emitted from the LEDs 15 increases. Thus, the light intensity of the light source 14 increases with the increase in the ambient light intensity.

When the LCD is taken out from the office and used in relatively low ambient light conditions, the light intensity in such conditions is typically in the range from about 1000 lux to about 100 lux. The energy received by the electrons of the atoms of the doped polycrystalline silicon unit 17 decreases with the decreased ambient light intensity. Therefore most of the electrons are trapped in covalent bonds, and only a few of the electrons may receive enough energy to become free electrons. As a result, the doped polycrystalline silicon unit 17 has fewer electrons to conduct electricity. Typically, the resistance of the doped polycrystalline silicon unit 17 increases from about 5 KΩ to about 50 KΩ. Thus the resistance of the photodetector 16 increases with the decrease in the ambient light intensity.

Accordingly, the voltage applied at the photodetector 16 increases with the decrease in the ambient light intensity. Because the voltage provided by the power supply 12 is constant, the voltage applied at the light source 14 correspondingly decreases. That is, the voltage applied at each of the LEDs 15 decreases, and the current flowing through the LEDs 15 decreases. Therefore the intensity of light emitted from the LEDs 15 decreases. Thus, the light intensity of the light source 14 decreases with the decrease in the ambient light intensity.

When the LCD is used in very low ambient light conditions, the light intensity in such conditions is typically in the range from about 100 lux to 0 lux. The energy received by the electrons of the atoms of the doped polycrystalline silicon unit 17 is not strong enough to enable virtually any of the electrons to become free electrons. That is, the doped polycrystalline silicon unit 17 has few or no free electrons to conduct electricity. The resistance of the doped polycrystalline silicon unit 17 is typically greater than 50 KΩ, and may even have a value approaching infinity. In other words, the doped polycrystalline silicon unit 17 is effectively nonconductive. As a result, the resistance of the photodetector 16 is essentially determined by the resistance of the resistor 18. Because the resistance of the resistor 18 is constant, the voltage applied at each of the LEDs 15 is also constant, and the current flowing through the LEDs 15 is constant. Thus, the light intensity of the light source 14 is constant or almost constant when the ambient light intensity is lower than 100 lux.

Figure 3:
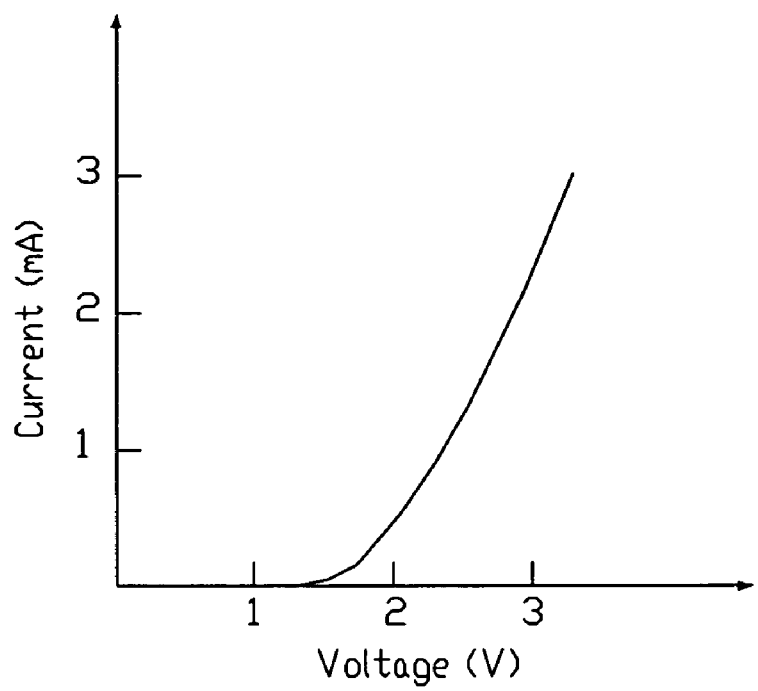
FIG. 3 is a graph showing a relationship between voltage applied at one light emitting diode of FIG. 1 and current flowing though the light emitting diode.

FIG. 3 is a graph showing a relationship between voltage applied at one of the LEDs 15 and current flowing though the LED 15. The voltage is marked on the horizontal axis in volts (V), and the current is marked on the vertical axis in milliamperes (mA). As shown, when the voltage applied at the LED 15 is lower than 1.5V, there is almost no current flowing though the LED 15. That is, the LED 15 does not emit light. When the voltage applied at the LED 15 is higher than 1.5V, the current flowing though the LED 15 rapidly increases with an increase in the voltage. With this characteristic, the intensity of light emitted from the LEDs 15 suitably varies according to changes in the resistance of the doped polycrystalline silicon unit 17. Thus, the light intensity of the light source device 10 suitably changes in response to variations in the ambient light intensity.

A summary of operation of the LCD is as follows. When the LCD is used in high ambient light conditions, the resistance of the doped polycrystalline silicon unit 17 decreases with the increase in the ambient light intensity. Therefore the current flowing through the LEDs 15 increases so as to increase the light intensity of the light source 14. That is, the light intensity of the LCD increases automatically in response to the increase in the ambient light intensity. As a result, the contrast between the light of the LCD and the light of the ambient environment is improved, and a user of the LCD can see the displayed images clearly.

When the LCD is used in low ambient light conditions, the resistance of the doped polycrystalline silicon unit 17 increases with the decrease in the ambient light intensity. Therefore the current flowing through the LEDs 15 decreases so as to decrease the light intensity of the light source 14. That is, the light intensity of the LCD decreases automatically in response to the decrease in the ambient light intensity. As a result, the contrast between the light of the LCD and the light of the ambient environment is reduced, and the user of the LCD can view the displayed images comfortably.

Furthermore, when the LCD is used in low ambient light conditions, the current flowing through the LEDs 15 decreases. This decreases the power consumption of the LCD, and increases the battery life. Moreover, the light source device 10 includes the power supply 12, the light source 14, and the photodetector 16. The structure of the light source device 10 is simple, so that the light source device 10 can be easily installed in a handheld electronic product such as a mobile phone, a personal digital assistant, a video camera, and the like.

Figure 4:
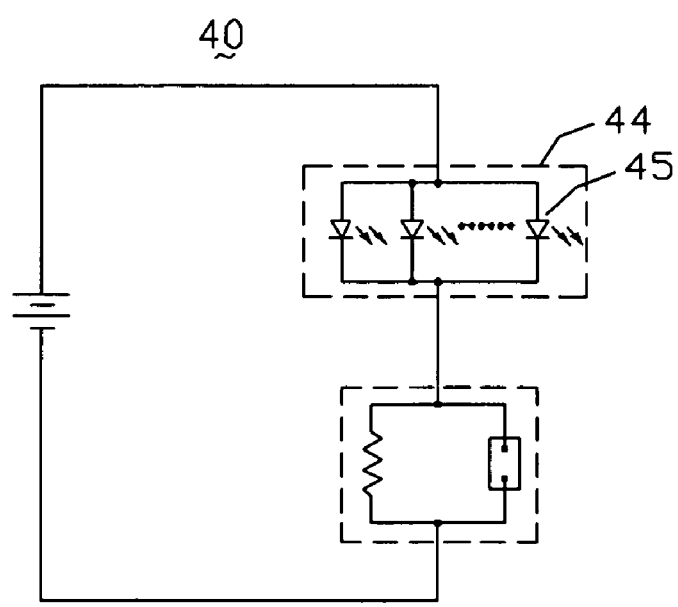
FIG. 4 is a schematic, abbreviated diagram of certain components of a light source device according to a second embodiment of the present invention.

FIG. 4 is a schematic, abbreviated diagram of certain components of a light source device 40 according to a second embodiment of the present invention. The light source device 40 has a structure similar to the light source device 10 of the first embodiment. However, a light source 44 of the light source device 40 includes a plurality of LEDs 45 that are connected in parallel.

Various modifications and alterations of the above embodiments are possible. The amount of doping atoms of the doped polycrystalline silicon unit 17 may be changed so as to change the sensitivity of the photodetector 16. For example, add more doping atoms to the doped polycrystalline silicon unit 17 increases the light sensitivity of the photodetector 16. The doping atoms may be boron atoms, phosphorus atoms, arsenic atoms, and the like.

It is to be further understood that even though numerous characteristics and advantages of the present embodiments have been set out in the foregoing description, together with details of the structures and functions of the embodiments, the disclosure is illustrative only; and changes may be made in detail, especially in matters of shape, size, and arrangement of parts within the principles of the invention to the full extent indicated by the broad general meaning of the terms in which the appended claims are expressed.

What is claimed is:

1. A light source device, comprising:
   a power supply;
   a light source; and
   a photodetector comprising a light sensor and a resistor connected in parallel;
   wherein the power supply, the light source, and the resistor are connected in series, and when the intensity of ambient light increases, a resistance of the light sensor decreases so as to increase a light intensity of the light source, and when the intensity of ambient light decreases, the resistance of the light sensor increases so as to decrease the light intensity of the light source.

2. The light source device as claimed in claim 1, wherein the light sensor is a doped polycrystalline silicon unit.

3. The light source device as claimed in claim 1, wherein the photodetector is configured to detect the intensity of the ambient light when the intensity of the ambient light is in the range from 0 lux to 10000 lux.

4. The light source device as claimed in claim 1, wherein the resistance of the light sensor is in the range from $0.5K\Omega$ to infinity when the light sensor responds to changes in the intensity of the ambient light.

5. The light source device as claimed in claim 4, wherein the resistance of the light sensor is approximately $5K\Omega$ when the intensity of the ambient light is approximately 1000 lux.

6. The light source device as claimed in claim 1, wherein the light source comprises a plurality of light emitting diodes.

7. The light source device as claimed in claim 6, wherein current flowing though the light emitting diodes increases with an increase in voltage applied to the light emitting diodes.

8. The light source device as claimed in claim 6, wherein the light emitting diodes are connected in series.

9. The light source device as claimed in claim 6, wherein the light emitting diodes are connected in parallel.

10. The light source device as claimed in claim 2, wherein the doped polycrystalline silicon unit comprises doping atoms, and the sensitivity of the light sensor is proportional to the amount of doping atoms in the doped polycrystalline silicon unit.

11. The light source device as claimed in claim 10, wherein the doping atoms are selected from the group consisting of boron atoms, phosphorus atoms, and arsenic atoms.

12. A method for modulating a brightness of light emitted by a light source device, the method comprising:
    providing a power supply and a light source, the power supply providing a constant voltage to the light source;
    providing a photodetector, the photodetector comprising a doped polycrystalline silicon unit and a fixed resistance connected in parallel, the fixed resistance connected to the light source and the power supply in series, the doped polycrystalline silicon unit being sensitive to light and automatically changing its resistance in response to changes in ambient light;
    exposing the photodetector to ambient light; and
    the doped polycrystalline silicon unit automatically changing its resistance in response to a change in the ambient light, the photodetector thereby automatically modulating its own resistance, and thereby modulating a current passing through the light source such that a brightness of light emitted by the light source is modulated according to the ambient light.

13. The method as claimed in claim 12, wherein when the brightness of the ambient light increases, the resistance of the doped polycrystalline silicon unit decreases and the current passing through the light source increases such that the brightness of the light emitted by the light source increases.

14. The method as claimed in claim 12, wherein when the brightness of the ambient light decreases, the resistance of the doped polycrystalline silicon unit increases and the current passing through the light source decreases such that the brightness of light emitted by the light source decreases.

15. The method as claimed in claim 12, wherein the ambient light comprises radiation in the infrared, visible, and ultraviolet regions of the light spectrum.

16. The method as claimed in claim 12, wherein the intensity of the ambient light ranges from 0 lux to 10000 lux.

17. A liquid crystal display, comprising:
    a liquid crystal panel; and
    a light source device positioned for illuminating the liquid crystal panel, the light source device comprising:

a power supply;

a light source; and a photodetector comprising a light sensor and a resistor connected in parallel;

wherein the power supply, the light source, and the resistor are connected in series, and when the intensity of ambient light increases, a resistance of the light sensor decreases so as to increase a light intensity of the light source, and when the intensity of ambient light decreases, the resistance of the light sensor increases so as to decrease the light intensity of the light source.

* * * * *